Feb. 7, 1967  F. J. GRAFF  3,302,488
AUTOMATICALLY VARIABLE PLANETARY TRANSMISSION
Filed Feb. 5, 1963  2 Sheets-Sheet 1

Frederick J. Graff
INVENTOR.

BY *Clarence A. O'Brien*
*and Harvey B. Jacobson*
Attorneys

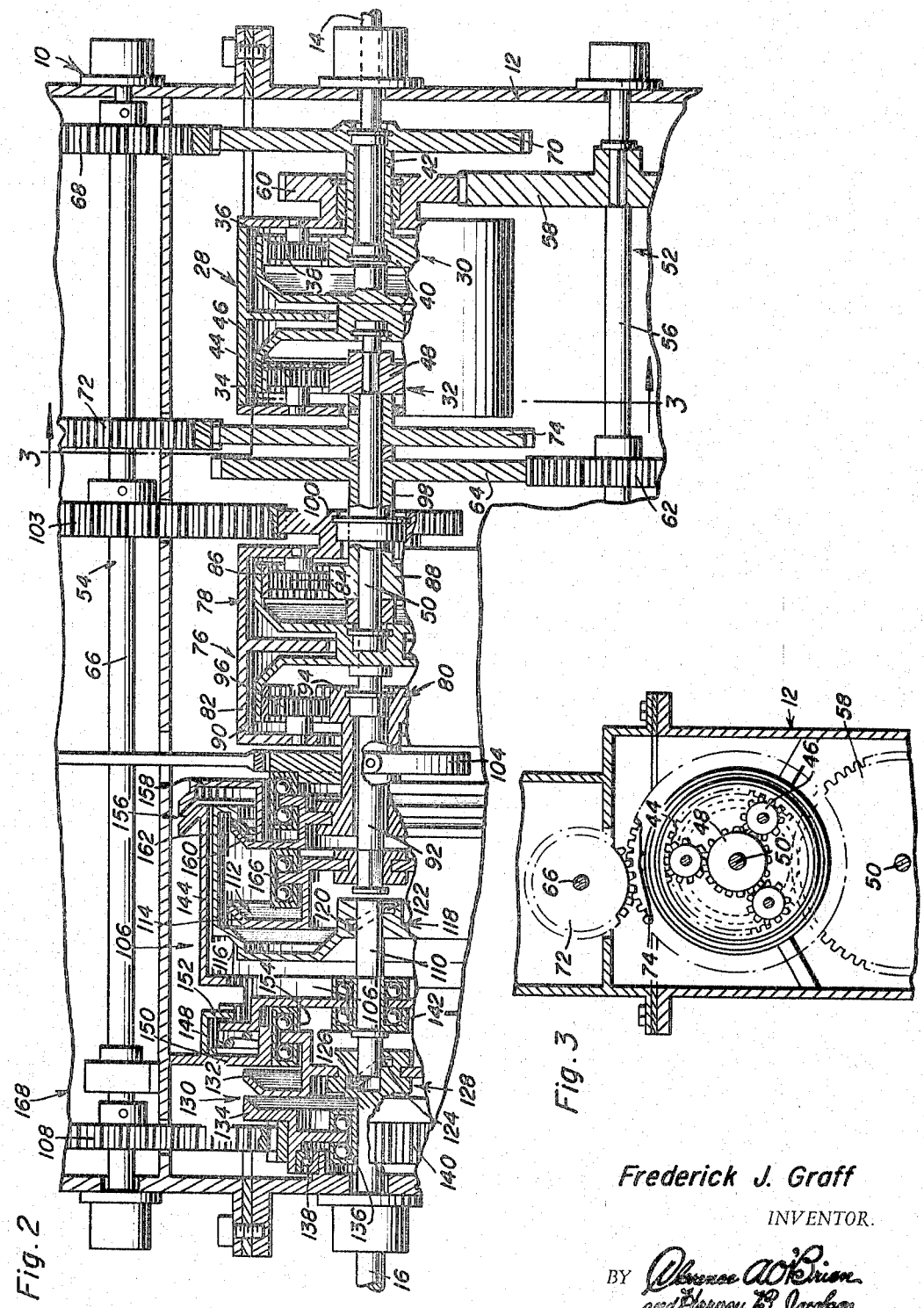

United States Patent Office 3,302,488  
Patented Feb. 7, 1967

3,302,488  
AUTOMATICALLY VARIABLE PLANETARY  
TRANSMISSION  
Frederick J. Graff, 190 S. Main St.,  
St. George, Utah 84770  
Filed Feb. 5, 1963, Ser. No. 256,423  
21 Claims. (74—751)

This invention relates to a transmission for automotive types of vehicle and more particularly, to a variable drive transmission particularly suited for heavy-duty types of vehicles.

It is therefore a primary object of the present invention to provide a transmission adapted to drivingly connect a torque-producing engine of the internal combustion type to a loaded output shaft such as the vehicle wheel drive propeller shaft, power being transmitted by the transmission in such a manner as to accommodate variable loading on the output shaft without overloading the engine shaft and without overspeeding of the engine shaft.

Another object of the present invention is to provide an automatically variable transmission, the drive ratio of which is varied in accordance with the torque ratio between the engine shaft and the output shaft without use of a hydraulic type of torque converter.

A further object of the present invention is to provide an automatic transmission for vehicles of the automotive type capable of handling relatively large amounts of power and transmitting relatively large amounts of torgue so as to render it suitable for heavy-duty types of vehicles such as diesel trucks.

An additional object of the present invention is to provide an automatically variable transmission of the planetary type in which normal operation occurs without engagement and disengagement of driving connections. The transmission is thereby rendered reasonable in size, weight and cost.

A still further object of the present invention in accordance with the foregoing objects, is to provide an automatically variable transmission featuring a novel torque-responsive mechanism operative to prevent engine overspeeding by producing a relatively constant retarding torque when the torque ratio between the engine output and the load on the output shaft is reduced below a predetermined low value.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a partial side sectional view of the transmission.

FIGURE 3 is a apartial transverse sectional view of the transmission taken substantially along the plane indicated by section line 3—3 in FIGURE 2.

Figure 1:
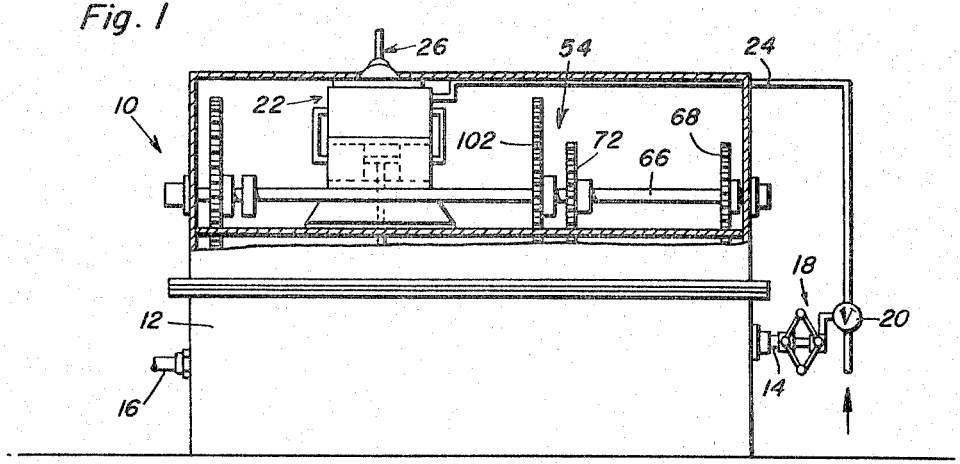
FIGURE 1 is a simplified side elevational view of the transmission within its housing with parts broken away and shown in section.

Referring now to the drawings in detail, it will be observed from FIGURES 1 and 2, that the transmission generally referred to by reference numeral 10 may be housed within any suitable housing 12 installed within an automotive-type of vehicle for the purpose of establishing a variable drive connection between the engine of the vehicle and the vehicle wheel driving propeller shaft. Accordingly, the engine shaft is connected to the input shaft 14 extending into the transmission housing 12 for the purpose of delivering power to the final output shaft 16 which extends from the transmission housing. Suitable bearing assemblies are therefore mounted on the transmission housing for journaling the input shaft 14 and output shaft 16 respectively. Associated with the input shaft 14, as more clearly seen in FIGURE 1, is a speed-responsive governor mechanism 18 operative to control the control valve 20 in accordance with the speed of the input shaft or the engine shaft whereby a hydraulic shifting device 22 connected to the control valve 20 through hydraulic line 24, may condition the transmission for forward drive above a predetermined minimum speed of the engine. A selectively controlled gear shift device 26 is also associated with the hydraulic shift mechanism 22 for the purpose of conditioning the transmission for reverse drive when desired.

Referring now to FIGURE 2 in particular, it will be observed that the input shaft 14 is operatively connected to a torque dividing gear assembly generally referred to by reference numeral 28 rotatably supported within the transmission housing. The torque dividing gear assembly includes a pair of interconnected planetary gear units 30 and 32 having a common planetary carrier cage 34 which forms an enclosure for the assembly 28. The orbit gear 36 of the planetary unit 30 is directly connected to the input shaft 14 and meshes with a plurality of planetary pinions 38 rotatably mounted on the common carrier 34. Meshing with the pinions 38, is a control sun gear 40 connected to the shaft 42 which is journaled on the input shaft 14 by spaced bearings. Also directly connected to the input shaft 14, is the input orbit gear 44 of the planetary gear unit 32. A plurality of planet pinions 46 also meshes with the orbit gear 44 as more clearly seen in FIGURE 3, said planet pinions being rotatably mounted on the common carrier cage member 34. Meshing with the planet pinions 46, is the sun gear 48 which is secured to one end of the supporting shaft 50. As will be hereafter explained, the torque dividing assembly 28 is operative to establish two power paths through which drive is transmitted at differential drive ratios that are varied in accordance with relative speed and torque conditions of the engine and load. To this end, a low drive transmitting gear train 52 and a high drive transmitting gear train 54 are provided and drivingly connected to the torque dividing gear assembly 28.

The low drive transmitting gear train as more clearly seen in FIGURE 2, is of the countershaft gear type including a countershaft 56 rotatably mounted by the housing 12 in parallel spaced relation to the input shaft 14. Fixed to the countershaft 56 adjacent the forward end thereof, is a countershaft gear member 58 which is drivingly connected to the gear assembly 28 by meshing engagement with the gear member 60 fixed for rotation with the common planetary cage 34. Also connected to the countershaft 56 is the gear member 62 which meshes with the gear member 64 rotatably mounted on the support shaft 50. The drive transmitting gear train 54, is also of the countershaft gear type including a relatively long countershaft 66 rotatably mounted by the housing in parallel spaced relation to the input shaft 14 and output shaft 16. Connected to the countershaft 66 adjacent the forward end thereof, is the countershaft gear 68 which meshes with the gear 70 fixed to the forward end of the shaft 42 whereby the drive transmitting gear train 54 is drivingly connected to the gear assembly 28 through the sun gear 40 thereof to which the shaft 42 is connected. Also connected to the countershaft 66 is a gear member 72 which meshes with a gear member 74 fixed to the support shaft 50 and thereby to the sun gear 48 of the planetary gear unit 32. Accordingly, the drive transmitting gear train 54 is also drivingly connected to the torque dividing assembly 28 by means of the sun gear 48. Both the drive transmitting gear trains 52 and 54 are also drivingly connected to the gear assembly 76 which includes a torque combining planetary gear unit 78 and a drive conditioning planetary gear unit 80.

The gear assembly 76 includes an enclosing planetary cage 82 which is drivingly common to both planetary gear units 78 and 80. The carrier 82 therefore rotatably mounts a plurality of planet pinions 84 which mesh with the orbit gear 86 and the sun gear 88 of the planetary gear unit 78. The orbit gear 90 is interconnected with the orbit gear 86 for rotation together therewith and is also connected to a driven shaft 92 upon which the sun gear 94 of the planetary gear unit 80 is rotatably journaled. The planetary gear unit 80 is also provided with a plurality of planet pinions 96 rotatably mounted on the carrier cage 82, said planet pinions meshing with the orbit 90 and the sun gear 94. The torque combining planetary gear unit 78 is drivingly connected to the low drive transmitting gear train 52 by means of the sun gear 88 connected to the gear 64 by the shaft 98 which is rotatably journaled on the support shaft 50. The planet cage 82 also associated with the torque combining gear unit 78, is drivingly connected to the high drive transmitting gear train 54 by means of the gear 100 which is connected to the planet carrier 82 and meshes with the countershaft gear 102 fixed to the countershaft 66. The sun gear 94 associated with the drive conditioning gear unit 80, is axially shiftable by means of the shifting yoke 104 which is connected to the hydraulic shifting mechanism 22 as hereinbefore indicated. The drive conditioning gear assembly 80 is therefore associated with a torque responsive control mechanism 106 also housed within the transmission housing and to which the output shaft 16 is operatively connected. The torque responsive controlling mechanism 106 is also drivingly connected to the high drive transmitting gear train 54 by means of the countershaft gear member 108 connected to the countershaft 66 adjacent the output end of the transmission.

Power is transmitted from the gear assembly 76 to the output shaft 16 by means of an output shaft assembly axially aligned with the input shaft 14 and the support shaft 50. The output shaft assembly therefore includes the driven shaft 92 directly connected to the orbit gears 86 and 90 of the gear assembly 76, and an axially shiftable intermediate shaft 110 which is axially aligned with the driven shaft 92 and the final output shaft 16. The torque responsive control mechanism 106 is therefore supported in coaxial relation about the driven shaft 92, the intermediate shaft 110 and the final output shaft 16 of the output shaft assembly. The torque responsive controlling mechanism 106 includes therefore, a forward drive clutch 112 which includes a clutch member 114 fixed to a non-circular portion of the driven shaft 92 at the output end thereof for the purpose of drivingly coupling the orbit gears 90 and 86 to the intermediate shiftable shaft 110 which mounts the driven clutch member 116 of the forward drive clutch 112. The driven clutch member 116 therefore includes a connecting hub portion 118 having an internal spiral groove 120 receiving a coupling pin 122 fixed at the forward end of the intermediate shaft 110 so that when rotation is imparted to the driven clutch member 116, in a direction reverse to that of shaft 14 with sufficient torque, the intermediate shaft 110 will be axially shifted forwardly by a limited amount before rotation is imparted thereto. Also connected to the end of the intermediate shaft 110 opposite the end to which the coupling pin 122 is connected, is a second coupling pin 124 received within an internal spiral groove 126 formed within a torque responsive coupling hub 128 mounted on the inner end of the final output shaft 16 for relative axial shifting between the final output shaft 16 and the intermediate shaft 110. Accordingly, a torque responsive clutch assembly 130 is provided including a clutch member 132 mounted on the coupling hub 128 for axial shift therewith into and out of engagement with the clutch member 134 rotatably mounted on the output shaft 16 by the bearing 136 and held against axial displacement by the thrust bearing 138. Fixed to the clutch member 134, is the gear member 140, the gear member 140 meshing with the countershaft gear 108 whereby the output shaft 16 may be drivingly connected to the drive transmitting gear train 54 when the torque responsive clutch assembly 130 is engaged. Engagement of the torque responsive clutch 130 is effected by axial shift of the shaft 110. The intermediate shaft 110 therefore rotatably mounts by means of the axial thrust bearing 142, a disengageable brake member 144 secured to the thrust bearing 142 seated on the portion 146 of the intermediate shaft 110 for axial displacement thereof in both directions. The disengageable brake member 144 together with the intermediate shaft 110 axially connected thereto, is urged toward the input end of the transmission or in a right hand direction as viewed in FIGURE 2 by means of a compression spring 148 seated within a fixed annular brake member 150. The brake member 150 is therefore provided with brake engaging projections 152 engaged with the disengageable brake member 144 when it is in the illustrated position. Axial thrust applied to the intermediate shaft 110 when rotational torque is applied to the driven clutch member 116, will therefore be effective to cause axial displacement of the disengageable brake member 144 against the bias of the compression spring 148 so as to disengage the brake elements 152 therefrom as well as to axially shift the clutch member 132 into engagement with the clutch member 134 through the thrust bearing 154. Also associated with the disengageable brake member 144, is a brake coupling 156 including the coupling member 158 which is axially shiftable into engagement with the disengageable brake member 144 by the shifting yoke 104. The coupling member 158 is also connected to the clutch member 160 of the reverse drive clutch 162, this clutch member 160 being connected to the sun gear 94 of the drive conditioning gear assembly 80 and axially shifted therewith through the thrust bearing 164 mounted on the shifting yoke 104. A thrust bearing 166 is also engaged by the clutch member 160 when axially shifted so as to axially displace the clutch member 114 into engagement with the driven clutch member 116 for engaging the forward drive clutch 112. It will therefore be apparent, that axial shift of the shifting yoke 104 will be simultaneously effective to couple the driven shaft 92 to the driven clutch member 116 on the intermediate shaft 110 and couple the sun gear 94 to the disengageable brake member 144 through the brake coupling 156. If insufficient torque is being transmitted from the engine through clutch 112, simultaneous engagement of the brake coupling 156 by forward drive shift of yoke 104 would load the gear assembly 76 before any torque responsive disengagement of brake 144 could occur and thereby prevent transmission of power to the output shaft assembly and undesirable loading of the engine. The transmission of a predetermined torque through the forward drive clutch 112 will therefore be necessary to cause axial shift of the intermediate shaft 110 against the bias of the spring 148 so as to release the brake member 144 for rotation with the sun gear 94 and at the same time, engage the torque responsive clutch 130 so as to drivingly connect the output shaft 16 to the gear 140 and the high drive transmitting gear train 54 through the countershaft gear 108 meshing with the gear 140. When however, the torque ratio between the input and output falls below a predetermined amount, the spring 148 will be effective to cause simultaneous disengagement of the clutch 130 and engagement of the brake member 144 with the brake elements 152 so as to hold the sun gear 94 stationary in view of the connection established by the brake coupling 156 simultaneously with the engagement of the forward drive clutch 112 which maintains the driving connection between the driven shaft 92 and the output shaft assembly. It will therefore be further apparent, that when the disengageable brake member 144 is engaged or held stationary, the clutch 130 will be disengaged so as to drivingly disconnect the output shaft 16 from the high drive transmitting gear train 54. Also associated with the high drive transmitting gear train 54 and rendered operative when it is drivingly disconnected from the output shaft 16, is a one-way brake device 168 operative to prevent rotation of the countershaft 66 in the direction opposite to the direction in which it is initially urged by the input shaft 14.

Figure 4:
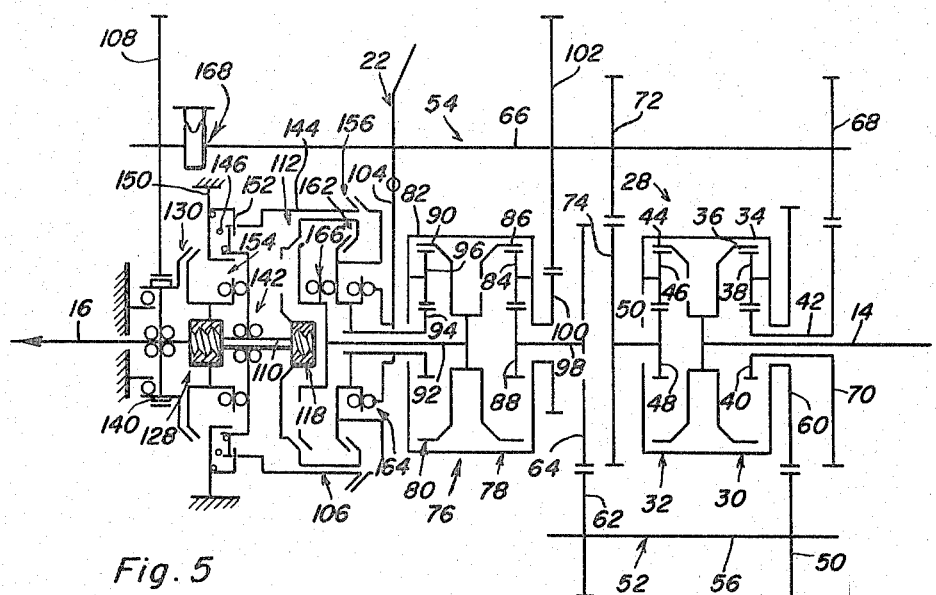
FIGURE 4 is a schematic illustration of the transmission incorporating the principles of the invention.

From the foregoing description of the transmission components and arrangement of parts, operation of the transmission in accordance with the principles of the present invention will become apparent. When the engine is idling below a predetermined minimum speed, yoke 104 will be in its neutral position as shown in FIGS. 2 and 4 so that no drive will be transmitted from shaft 92 to the output shaft. Shaft 92 will then be driven by the input shaft 14 at a fixed drive ratio through the drive train 52 only since the one-way brake 168 is engaged. Should the yoke 104 be shifted to its forward drive position prematurely, the torque transmitted through clutch 112 will not be sufficient to overcome the axial bias of spring 146 in order to release brake 144. Engagement of brake coupling 156 would then load gear assembly 76 to prevent further transmission of power through drive train 52 and undesirable loading of the engine. When the engine speed exceeds said predetermined minimum so that requisite torque may be developed, the governor controlled valve 20 will be operative to admit fluid under pressure to the hydraulic actuator 22 for the purpose of shifting the yoke 104 in a left hand axial direction as viewed in FIGURES 2 and 4 so as to initiate engagement of the forward drive clutch 112 and the brake coupling 156, as aforementioned whereby the driven shaft 92 may transmit rotative torque to the output shaft 16 through the intermediate shaft 110 in a direction opposite to the rotation of input shaft 14. Under loaded starting conditions, an initial drive ratio between the input shaft and the output shaft will be established by engagement of the drive ratio establishing one-way brake 168 as aforementioned holding the countershaft 66 stationary since the power applied to the input shaft 14 would tend to produce rotation of the sun gears 40 and 48 in the same direction and rotation of the countershaft in that direction in which the one-way brake 168 engages. Accordingly, the sun gears 40 and 48 of the torque dividing gear assembly 28 geared to the countershaft 66 are held stationary and thereby initiate a low drive or high reduction ratio drive through the planetary gear units of the gear assembly 28 drivingly connected to the low drive transmitting gear train 52 by meshing engagement between the gears 60 and 58. Power is therefore transmitted to the sun gear 88 of the torque combining planetary gear unit 78 at a high reduction ratio through the meshing gears 62 and 64 of the low drive train. Reverse rotation relative to input shaft 14 will therefore be transmitted from the sun gear 88 to the driven shaft 92 inasmuch as the carrier 82 is then also held stationary by the one-way brake device 168, since the carrier is also drivingly connected to the counter-shaft 66 by the gears 100 and 102. This rotation of shaft 92 will be effective during initial engagement of the clutch 112 and prior to full engagement of brake coupling 156 to cause torque responsive axial shift of the intermediate shaft 110 before rotation is imparted to the output shaft 16 so as to disengage the brake member 144 and engage the clutch 130 as hereinbefore described. Thus, no rotation will be imparted to the output shaft 16 until it is drivingly coupled to drive train 54 so that when it is rotated in a forward direction through drive train 52, it will cause release of the one-way brake 168 and thereby transmit the torque loading on the output shaft to the carrier 82 of the torque combining gear unit 78 and the sun gears 40 and 48 of the torque dividing gear assembly 28. When drivingly coupled to the shaft 16 by clutch 130, the shaft 110 will be held in its shifted position by the torque responsive coupling 124–126 as long as the drive train 54 is loaded by the output shaft. It will therefore be apparent, that the one-way brake device 168 will be effective to initiate operation of the transmission as it is shifted to its forward drive condition so that power may then be split into two paths through the drive transmitting gear trains 52 and 54 respectively to be combined by the torque combining planetary unit 78 in accordance with the load conditions prescribed by the output shaft loading in view of the driving connection established between the output shaft and the high drive transmitting gear train 54. Accordingly, a major portion of the power will initially be transmitted through the power path established by the low drive transmitting gear train 52 since this will offer the lower path of resistance. As the loading on the output shaft 16 is reduced or overcome by the torque output of the engine, more power will be transmitted through the power path established by the drive transmitting gear train 54. Accordingly, the drive ratios through the respective power trains will vary in accordance with the proportion of the torque being transmitted and this variation in the respective drive ratio differential will depend upon the relative ratio of the torque imposed on the input shaft by the engine and the torque loading on the output shaft 16.

Should the torque ratio of engine torque to loading torque be reduced below a predetermined minimum, as for example when the accelerator pedal is released, the brake compression spring 146 will be operative to cause axial displacement of the brake member 144 so as to simultaneously disengage the clutch 130 and hold the sun gear 94 stationary as hereinbefore indicated. Under these conditions, the drive conditioning gear unit 80 will be operative to prescribe a predetermined differential speed ratio between the carrier 82 and the orbit gear 86 of the torque combining gear unit 78 in view of the braking of sun gear 94 by brake 144 at the same time that the influence of the output shaft torque through drive train 54 is removed by virtue of the disengagement of the clutch 130. Accordingly, power will be transmitted at fixed drive ratios through the two power paths established by the gear assembly 28 and the drive transmitting gear trains 52 and 54. In this way, overspeeding of the engine is prevented since the drive ratios through the power paths are no longer prescribed by the output shaft loading. Of course, when the torque ratio above the aforementioned predetermined value is restored so as to call for an accelerating drive connection through the transmission, transmission through the two power paths at varying drive ratios in accordance with output torque loading will be resumed.

When reverse drive is desired (which is in the same direction as input shaft 14), immediate selective displacement of the shifting yoke 104 will be effective to cause engagement of the reverse drive clutch 162 and disengagement of the brake coupling 156. Accordingly, the sun gear 94 of the drive conditioning planetary gear unit 80 will then be drivingly connected to the intermediate shaft 110 and the output shaft 16. Under these conditions, the clutch 130 will remain disengaged while the brake member 144 will be disconnected from the sun gear 94. Power from the input shaft 14 will then be transmitted through the gear assembly 28 and the low drive transmitting gear train 52 to the planetary unit 78 with the one-way brake 168 being effective through the countershaft 66 to hold the sun gears 40 and 48 stationary as well as the carrier 82 as hereinbefore described in connection with initiation of forward drive. However, while the forward drive ratio so established is operative to transmit rotation to the shaft 92 coupled by the clutch 112 to the output shaft assembly, in the reverse drive condition, the shaft 92 will be disconnected from the output shaft assembly. Instead the orbit gears 86 and 90 will be drivingly connected by a reverse drive connection to the output shaft assembly through gear 94. This is accomplished by virtue of the carrier 82 being held stationary by the one-way brake so that the orbit gear 90 of the drive conditioning planetary unit 80 will be drivingly connected to the output shaft assembly through the engaged reverse clutch 162, rotation being reversed by the planetary pinions 96. A fixed high reduction ratio in a reverse direction for output shaft 16 is therefore established. The drive ratios established through the transmission of the present invention may be summarized as indicated in the following chart:

relatively large power requirements, and output load variations as well as to prevent overloading and overspeeding of the engine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

| Drive Condition | Engaged Elements | | | | | | Drive Ratio |
| --- | --- | --- | --- | --- | --- | --- | --- |
| | 168 | 162 | 112 | 156 | 144 | 130 | |
| | One Way Brake | Rev. Clutch | For. Clutch | Brake Coupl. | Torque Resp. Brake | Torque Resp. Clutch | |
| Loaded Start | X | | X | | | | $(1+S/0)(S/0)$ |
| Accelerating Drive | | | X | X | | X | $R(1+0/S)(1+S/0)-(1+0/S)+R_H(S/0)$ |
| Reduced Torque Ratio | | | X | X | X | | $(1+0/S)+SR_H-(0/S)(1+S/0)$ |
| Reverse | X | X | | | | | $-(1+S/0)$ |

In the foregoing chart, each of the planetary gear units is assumed to be identical in size and the speed ratio of the drive transmitting train 52 assumed to be 1:1. Also, S equals the number of sun gear teeth, 0 equals the number of orbit gear teeth, R equals the speed ratio in the drive transmitting gear train 54 between the gears 100 and 140, and $R_H$ equals the speed ratio between the gears 70 or 74 and the gear 140 in the drive transmitting gear train 54.

Figure 5:
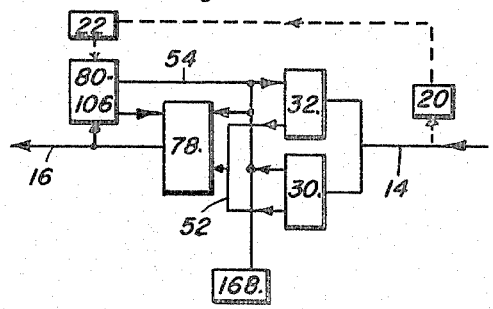
FIGURE 5 is a power flow diagram illustrating the underlying principles of the present invention.

Operation of the transmission may be further summarized by reference to the power flow diagram of FIGURE 5. It will therefore be observed, that the power from input shaft 14 is applied to the planetary units 30 and 32 from which it is split into power paths respectively established by the gear trains 52 and 54. Drive is therefore initiated by preventing flow of power through the power path 54 operatively connected to the drive establishing brake device 168. A high reduction drive may therefore proceed along the power path 52 to the torque combining unit 78 also conditoned for fixed reduction ratio drive by virtue of its operative connection to the brake device 168. Under these starting conditions, the drive connection to the torque responsive mechanism and drive conditioning gear unit will be operative to render the brake device 168 inoperative so as to establish driving connection in the power path 54. Forward drive may then proceed under control of the output loading on the shaft 16 with the drive ratios of the respective power paths 52 and 54 varying in accordance with the torque ratio between the input and output shafts. Conditioning of the torque responsive mechanism for forward drive occurs above a minimum speed of the input shaft 14 by virtue of the speed responsive hydraulic connection established between the speed responsive controlling valve 20 and the hydraulic actuator 22. It will also be recalled, that the torque responsive mechanism 106 is operative in conjunction with the gear unit 80 thereof to remove the influence of the output loading and described the power distribution between the power paths 52 and 54 when the torque ratio between the input and output shafts falls below a predetermined value. In this manner, the transmission of the present invention is capable of coping with

What is claimed as new is as follows:

1. In a transmission driven by a torque producing engine, torque dividing means operatively connected to said engine for operatively establishing a plurality of power paths from said engine, torque combining means operatively connected to said power paths, output means driven by said torque combining means through one or more of said plurality of power paths, drive ratio establishing means operatively engageable with the torque combining means and the torque dividing means to initiate drive through one of said plurality of power paths at a predetermined drive ratio between the engine and the output means, and torque ratio responsive means operatively connecting said output means to the torque combining means for rendering same effective to transmit power at variable drive ratios through said plurality of power paths above a predetermined torque ratio between the engine and the output means and at a fixed drive ratio below said predetermined torque ratio.

2. The combination of claim 1, including input speed responsive means operatively connected to said torque ratio responsive means for rendering said torque ratio responsive means effective above a predetermined speed of the engine.

3. The combination of claim 2, including reverse control means operatively connected to the input speed responsive means for selectively controlling the torque ratio responsive means to effect a reverse drive ratio through said one of the power paths.

4. The combination of claim 3, wherein said torque dividing means comprises, a pair of planetary gear units, each including drivingly engaging input, output and control elements, said input and control elements being respectively interconnected, and split torque transmitting means drivingly connecting said output elements and said control elements to the torque combining means and the output means respectively for completing said power paths.

5. The combination of claim 4, wherein said torque combining means comprises a planetary gear assembly having drivingly engaging input, output and control members, said output member being connected to the output means and said torque ratio responsive means, and said input and control members being drivingly connected to the torque dividing means through said power paths.

6. The combination of claim 5, wherein said drive ratio establishing means comprises, a one-way brake device operatively connected to the torque dividing and combining means through another of said power paths to prevent flow of power therethrough and hold the control member and the control elements of the torque combining and dividing means stationary.

7. The combination of claim 6, wherein said output means comprises, a driven load shaft assembly, and disengageable clutch means for directly connecting said load shaft assembly to the said torque combining means for drive at said predetermined drive ratio through said one of the power paths and for variable ratio drive through said power paths when the drive ratio establishing means is rendered inoperative.

8. The combination of claim 7, wherein said torque ratio responsive means comprises, gear means operatively connected to said torque combining means for transmitting power to the output means in reverse drive, engageable means operatively connected to said output means for rendering the drive establishing means inoperative in response to transmission of power directly to the output means from the torque combining means, brake coupling means operatively connected to the gear means for coupling the output means thereto, and disengageable brake means operatively connected to the coupling means for rendering the gear means effective below said predetermined torque ratio to prevent drive through the torque combining means.

9. The combination of claim 8, wherein said reverse control means comprises, selectively actuated clutch means for rendering the gear means of the torque ratio responsive means effective to establish a reverse ratio drive connection from the torque combining means to the output means.

10. The combination of claim 1, including reverse control means operatively connected to the torque ratio responsive means for selectively establishing a reverse drive connection between the torque combining means and the output means.

11. The combination of claim 1, wherein said torque dividing means comprises, a pair of planetary gear units, each including drivingly engaging input, output and control elements, said input and control elements being respectively interconnected, and split torque transmitting means drivingly connecting said output elements and said control elements to the torque combining means and the output means respectively for completing said power paths.

12. The combination of claim 11, wherein said torque combining means comprises a planetary gear assembly having drivingly engaging input, output and control members, said output member being connected to the output means and torque ratio responsive means, and said input and control members being drivingly connected to the torque dividing means through said power paths.

13. The combination of claim 12, wherein said drive ratio establishing means comprises, a one-way brake device operatively connected to the torque dividing and combining means through another of said power paths to prevent flow of power therethrough and hold the control member and the control elements of the torque combining and dividing means stationary.

14. The combination of claim 1, wherein said output means comprises, a driven load shaft assembly, and disengageable clutch means for directly connecting said load shaft assembly to the said torque combining means for drive at said predetermined drive ratio through said one of the power paths and for variable ratio drive through said power paths when the drive ratio establishing means is rendered inoperative.

15. The combination of claim 14, wherein said torque ratio responsive means comprises, gear means operatively connected to said torque combining means for transmitting power to the output means in reverse drive, engageable means operatively connected to said output means for rendering the drive establishing means inoperative in response to transmission of power directly to the output means from the torque combining means, brake coupling means operatively connected to the gear means for coupling the output means thereto, and disengageable brake means operatively connected to the coupling means for rendering the gear means effective below said predetermined torque ratio to prevent drive through the torque combining means.

16. The combination of claim 1, wherein said torque ratio responsive means comprises, gear means operatively connected to said torque combining means for transmitting power to the output means in reverse drive, engageable means operatively connected to said output means for rendering the drive establishing means inoperative in response to transmission of power directly to the output means from the torque combining means, brake coupling means operatively connected to the gear means for coupling the output means thereto, and disengageable brake means operatively connected to the coupling means for rendering the gear means effective below said predetermined torque ratio to prevent drive through the torque combining means.

17. The combination of claim 16, including reverse control means operatively connected to the torque ratio responsive means for selectively establishing a reverse drive connection between the torque combining means and the output means through said gear means.

18. In a transmission driven by a torque producing engine, output means adapted to be loaded, transmission means operatively connected to the engine and the output means for establishing at least two power paths between said engine and the output means, drive establishing means operatively engageable with said transmission means for preventing flow of power through one of said power paths to initiate drive through the other of said power paths at a fixed reduction drive ratio between the engine and the output means, accelerating drive means operatively engageable with said transmission means and rendered effective above a predetermined torque ratio between the engine and the output means to produce simultaneous drive through both of said power paths at respectively variable drive ratios, and means operatively connected to the output means and the transmission means for producing drive through one of said power paths at a fixed drive ratio in response to a reduction in the torque ratio between the engine and the output means below said predetermined torque ratio.

19. A transmission driven by an engine comprising, an input shaft, an output shaft, at least two drive trains through which power paths are established, torque dividing gear means drivingly connecting said engine to the drive trains for transmitting torque thereto, one-way brake means engageable with one of said drive trains for rendering the torque dividing gear means operative to transmit torque to the other of said drive trains only at a fixed drive ratio, torque combining gear means drivingly connected to said drive trains for transmiting torque therefrom to the output shaft, forward drive clutch means operatively connecting said torque combining gear means to the output shaft for initiating drive of the output shaft in one direction from the power path in said other of the drive trains only, torque responsive clutch means operatively connected to the output shaft for connection thereof to said one of the drive trains in response to said initiation of drive through said other of the drive trains, and drive conditioning means operatively connected to said torque combining gear means for alternatively transmitting torque to the output shaft from both of said drive trains at variable and fixed differential drive ratios.

20. The combination of claim 19 wherein each of said torque dividing and combining gear means includes a pair of drivingly engaged input and output elements, means interconnecting the input elements of the torque dividing gear means with the input shaft, means drivingly connecting the respective output elements of the torque dividing gear means to the drive trains, means drivingly connecting the respective input elements of the torque combining gear means to the drive trains, said drive conditioning means including, a reaction element drivingly engaged with input and output elements of the torque combining gear means, and torque responsive brake means operatively connected to said reaction element for rendering the torque combining gear means operative at said fixed differential drive ratio, said output elements of the torque combining gear means being interconnected with the forward drive clutch means.

21. The combination of claim 20 including, reverse drive clutch means operatively connected to said output shaft and the reaction element of the drive conditioning means for transmitting torque to the output shaft in a direction opposite to said one direction from the power path in said other of the drive trains.

References Cited by the Examiner

UNITED STATES PATENTS

| | | | |
|---|---|---|---|
| 1,848,216 | 3/1932 | Fulton | 74—752 |
| 2,046,468 | 7/1936 | La Fountain | 74—751 |
| 2,149,320 | 3/1939 | Szekely | 74—682 |
| 2,371,564 | 3/1945 | Wemp | 74—751 |
| 2,469,799 | 5/1949 | Valle | 74—751 |

FOREIGN PATENTS 1,155,459   12/1957   France.

DAVID J. WILLIAMOWSKY, *Primary Examiner.*

DON A. WAITE, *Examiner.*

T. C. PERRY, *Assistant Examiner.*